United States Patent [19]

Yoshida et al.

[11] Patent Number: 5,297,946
[45] Date of Patent: Mar. 29, 1994

[54] MULTILAYER PARISON EXTRUDER

[75] Inventors: Toshiji Yoshida; Hideaki Fukuda; Toshio Kagitani, all of Kanagawa; Keiji Fukuhara, Hiroshima, all of Japan

[73] Assignees: The Japan Steel Works, Ltd., Tokyo; Mazda Motor Corporation, Hiroshima, both of Japan

[21] Appl. No.: 971,683

[22] Filed: Nov. 4, 1992

Related U.S. Application Data

[63] Continuation of Ser. No. 769,504, Oct. 1, 1991, abandoned, which is a continuation of Ser. No. 554,762, Jul. 20, 1990, abandoned.

[30] Foreign Application Priority Data

Jul. 21, 1989 [JP] Japan ................. 1-187428

[51] Int. Cl.$^5$ .................. B29C 47/06; B29C 47/26
[52] U.S. Cl. ................. 425/132; 425/133.1; 425/462
[58] Field of Search ............. 425/133.1, 132, 462

[56] References Cited

U.S. PATENT DOCUMENTS

| | | | |
|---|---|---|---|
| 4,149,839 | 4/1979 | Iwawaki et al. | 425/133.1 |
| 4,167,383 | 9/1979 | Murakami et al. | 425/133.1 |
| 4,249,875 | 2/1981 | Hart et al. | 425/133.1 |
| 4,302,170 | 11/1981 | Goron | 425/133.1 |
| 4,403,934 | 9/1983 | Rasmussen et al. | 425/133.1 |
| 4,548,569 | 10/1985 | Pitigliano et al. | 425/133.1 |
| 4,717,326 | 1/1988 | Motonaga et al. | 425/133.1 |
| 4,758,144 | 7/1988 | Becker | 425/133.1 |
| 4,978,290 | 12/1990 | Fukuhara | 425/147 |

FOREIGN PATENT DOCUMENTS 1082043  5/1960 Fed. Rep. of Germany ... 425/133.1

Primary Examiner—Khanh Nguyen
Attorney, Agent, or Firm—Sughrue, Mion, Zinn, Macpeak & Seas

[57] ABSTRACT

A multilayer parison extruder includes a cylinder; an annular piston movably fitted in the cylinder; a material accumulation chamber in which the piston is moved; a material conduction chamber communicating with the accumulation chamber; an annular multilayer head provided in the conduction chamber; and a die slot provided under the conduction chamber. The extruder further includes a main material extruder for supplying a main material to the accumulation chamber; and auxiliary material extruders for supplying the auxiliary materials to the multilayer head. The extruder is characterized in that pairs of opposed feed ports are provided in the multilayer head and communicate with the auxiliary material extruders. At least one pair of the inlet ports is provided for each of a pair of arc-shaped passages which are for the auxiliary materials. The arc-shaped passages are connected to the feed ports so that each of the arc-shaped passages extends in opposite directions by nearly equal distances from the corresponding feed ports along the circumference of the multilayer head.

4 Claims, 5 Drawing Sheets

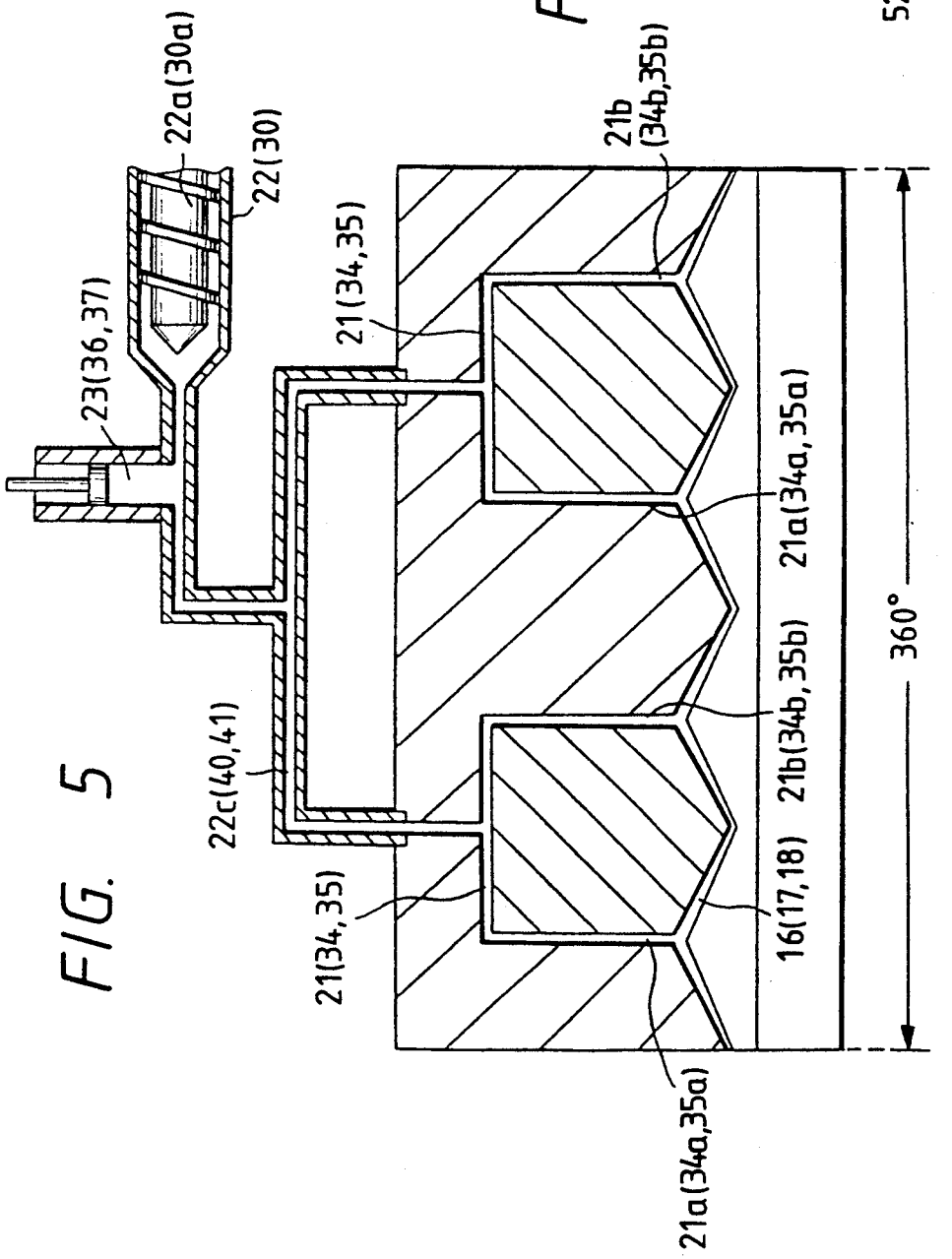

MULTILAYER PARISON EXTRUDER

This is a continuation of Ser. No. 07/769,504 filed Oct. 1, 1991 now abandoned, which is a continuation of application Ser. No. 07/554,762 filed Jul. 20, 1990 now abandoned.

BACKGROUND OF THE INVENTION

The present invention relates to a multilayer parison extruder and, in particular, to a multilayer parison extruder in which at least four inlet ports, for introducing a corresponding one of a plurality of auxiliary materials into a corresponding one of a plurality of cylindrical slots provided in a multilayer head, are located at nearly equiangular intervals along the circumference of the head so that the uniformity of the thickness of the circumferential wall of a multilayer parison formed by the extruder is enhanced.

In a conventional multilayer parison extruder disclosed in the Japanese Patent Application (OPI) No. 99115/87 (the term "OPI" as used herein means an "unexamined published application"), cylindrical slots for auxiliary materials are provided in a multilayer head disposed in a cylinder, and two inlet ports are provided for each of the cylindrical slots and opposed to each other in the diametral direction of the cylindrical slot. Each of the auxiliary materials is supplied into the corresponding cylindrical slot through the two inlet ports so that a cylindrical multilayer parison, in which a plurality of layers are made of the auxiliary materials between layers of a main material, is extruded. However, since each of the auxiliary materials is supplied into the corresponding cylindrical slot through the two inlet ports opposed to each other in the diametral direction of the slot, the thickness of the auxiliary material layer at the points along the diametral direction of the slot which are located perpendicular to the position of the inlet ports is made unequal with respect to the thickness of the portion of the layer which is located proximate to the inlet ports. For that reason, there is a problem in that the thickness of the parison is nonuniform so as to deteriorate the yield thereof.

SUMMARY OF THE INVENTION

The present invention was made in order to solve the above-mentioned problem.

Accordingly, it is an object of the present invention to provide a multilayer parison extruder in which at least four inlet ports, for introducing a corresponding one of a plurality of auxiliary materials into a corresponding one of a plurality of cylindrical slots disposed in a multilayer head, are located at nearly equiangular intervals along the circumference of the respective slot. Thus, the uniformity of the thickness of the circumferential wall of a multilayer parison formed by the extruder is enhanced.

The multilayer parison extruder comprises: a cylinder; an annular piston movably fitted in the cylinder; a material accumulation chamber in which the piston is moved; a material conduction chamber communicating with the accumulation chamber; the annular multilayer head provided in the conduction chamber; a die slot provided under the conduction chamber; a main material extruder for supplying a main material to the accumulation chamber; and auxiliary material extruders for supplying the auxiliary materials to the multilayer head. The extruder is characterized in that pairs of opposing feed ports are provided in the multilayer head and communicate with the auxiliary material extruders. At least one pair of inlet ports is provided for each of a pair of arc-shaped passages which are for the auxiliary materials. Each of the arc-shaped passages is connected to a corresponding one of the feed ports so that each of the arc-shaped passages extends in opposite directions by nearly equal distances from the corresponding feed port along the circumference of the multilayer head. The cylindrical slots are provided so that they are connected to the corresponding inlet ports. The auxiliary materials are supplied to the cylindrical slots through the corresponding inlet ports, the number of which is at least four for the corresponding cylindrical slot so that the inlet ports for the corresponding cylindrical slot are located at nearly equiangular intervals along the circumference of the multilayer head. Since each of the auxiliary materials is introduced into a corresponding cylindrical slot of the multilayer head through at least four inlet ports located at nearly equiangular intervals along the circumference of the head, the thickness of each of the cylindrical layers made from the auxiliary materials that are pushed out from the cylindrical slots is made uniform. For that reason, the multilayer parison made from the main and the auxiliary materials has a uniform thickness and a prescribed form when the parison is blown.

BRIEF DESCRIPTION OF THE DRAWINGS

FIG. 5 is a schematic developed view of A-portion shown in FIG. 1; and

FIG. 6 is a sectional view of a portion of a multilayer parison extruded by the extruder.

DETAILED DESCRIPTION OF THE PREFERRED EMBODIMENT

An embodiment of the present invention is hereafter described in detail with reference to the accompanying drawings.

FIGS. 1-5 show a multilayer parison extruder according to an embodiment of the invention.

Figure 1:
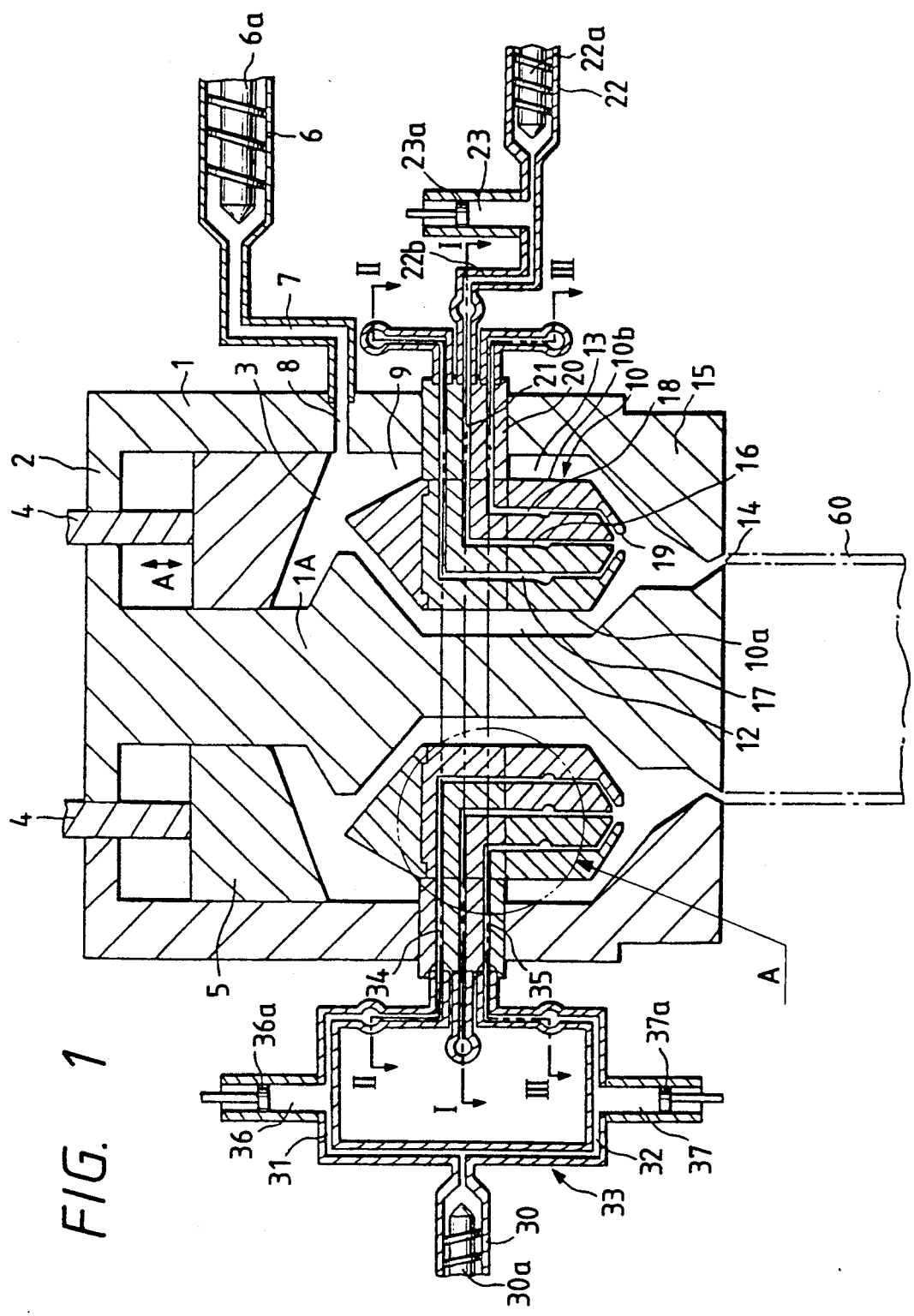
FIG. 1 is a longitudinal sectional view of a multilayer parison extruder according to an embodiment of the present invention.
Figure 2:
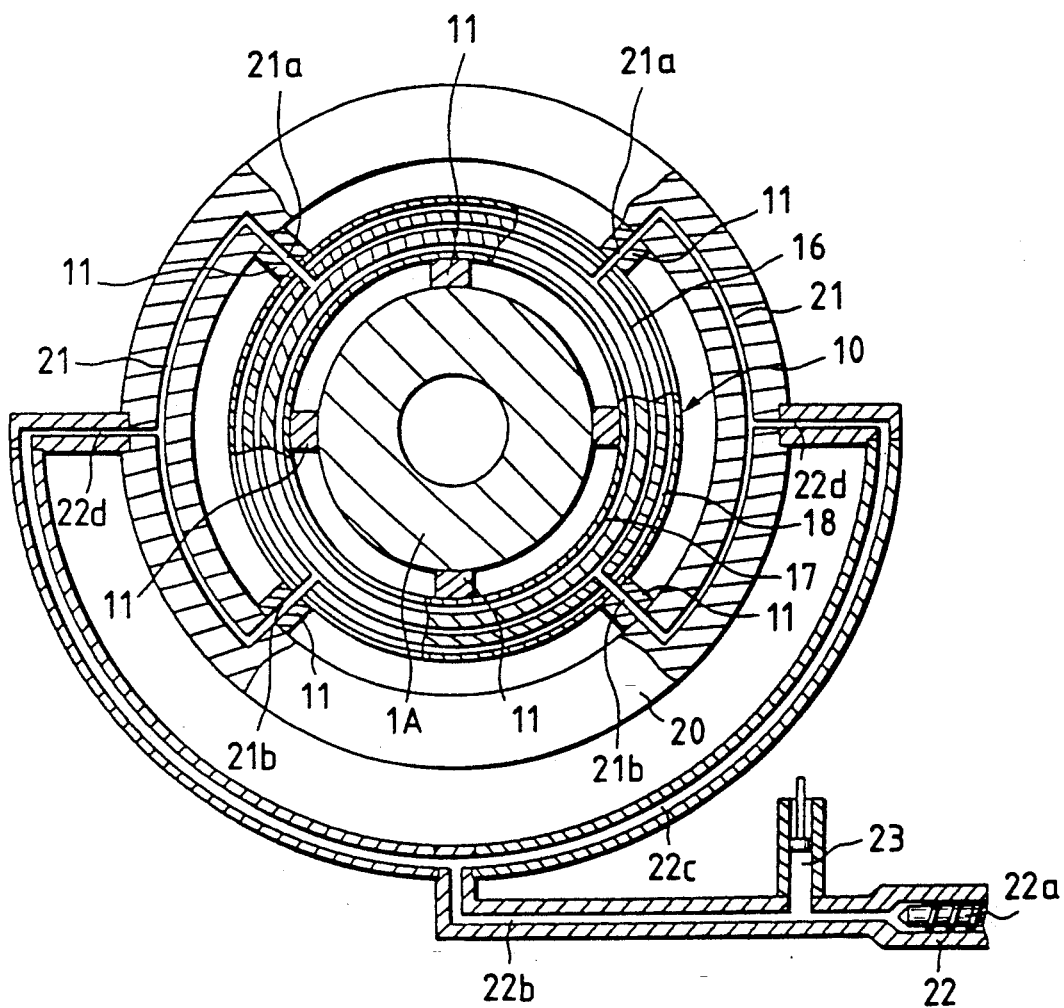
FIG. 2 is a cross-sectional view of the extruder taken along a line I—I shown in FIG. 1, and shows a first auxiliary material injection passage for forming a barrier layer.
Figure 4:
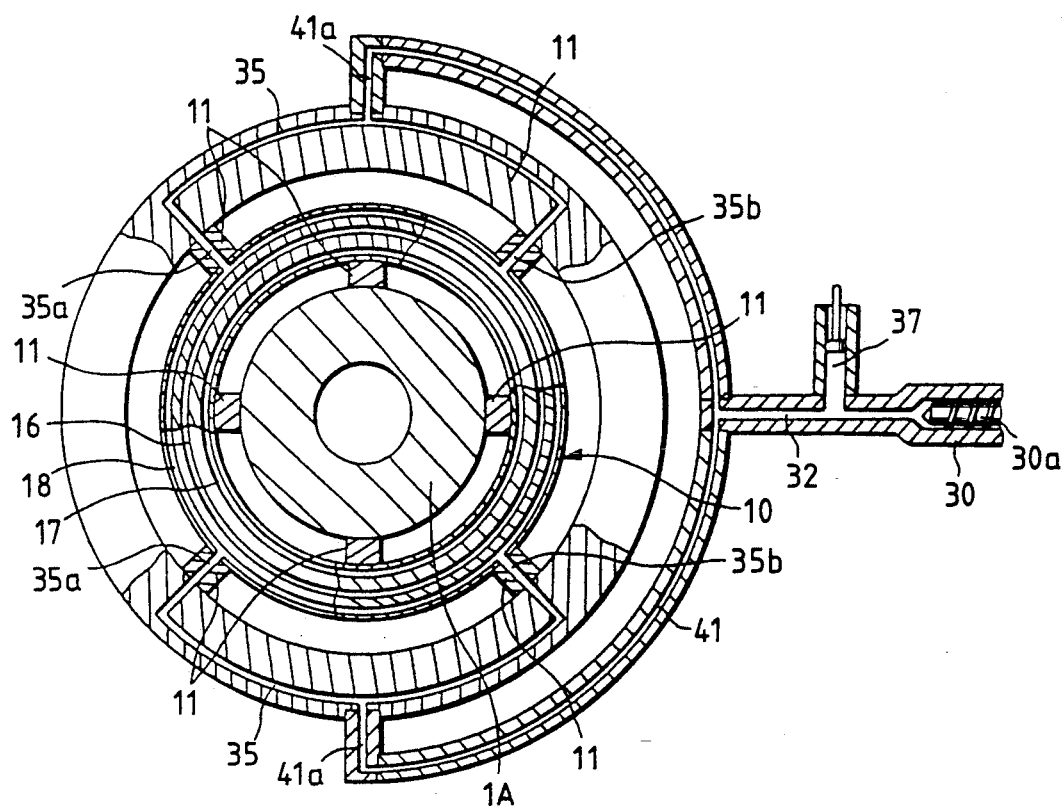
FIG. 4 is a cross-sectional view of the extruder taken along line III—III shown in FIG. 1, and shows a third auxiliary material injection passage for forming an outer layer.

A cylinder 1 is provided with a top plate 2 at the top thereof as shown in FIG. 1. In an annular material accumulation chamber 3 defined between the cylinder 1 and a columnar core 1A provided in the cylinder, an annular piston 5 is supported by rods 4 extending through the top plate 2. The piston 5 is movable up and down in the axial direction of the cylinder 1 as shown by the double-headed arrow A in FIG. 1. The cylinder 1 has a main material injection port 8 located at the bottom of the material accumulation chamber 3 and which communicates with a main material feed pipe 7 which in turn is connected to a main material extruder 6. A main material, which is pushed out from the main material extruder 6 by a screw shaft 6a thereof, is injected into the material accumulation chamber 3 through the main material injection port 8. An annular material conduction chamber 9 is defined under the annular material accumulation chamber 3 in the cylinder 1 and communicates with the accumulation chamber. An annular multilayer head 10 is supported in the material conduction chamber 9 by fastening members 11 provided on the inside and outside circumferential surfaces 10a and 10b of the head 10 as shown in FIGS. 2 and 4. An inner layer material passage 12 is defined on the inside circumferential surface 10a of the head 10, and an outer layer material passage 13 is defined on the outside circumferential surface 10b of the head, as shown in FIG. 1. A die 15 is conjoined to the bottom of the cylinder 1 so that an annular slot 14 is defined between the die and the core 1A and communicates with the material conduction chamber 9.

A cylindrical slot 16 for conducting a first auxiliary material as a barrier layer is provided in the radially central portion of the multilayer head 10. A cylindrical slot 17 for conducting a second auxiliary material as an inner adhesive layer and a cylindrical slot 18 for conducting the second auxiliary material as an outer adhesive layer are provided inside and outside the cylindrical slot 16, respectively. The slots 16, 17 and 18 communicate with the die slot 14 through the head confluence slot 19 provided in the bottom of the multilayer head 10.

A head ring 20 is provided on the outside circumferential surface 10b of the multilayer head 10 and is located between the cylinder 1 and the die 15. A first auxiliary material extruder 22 is provided outside the head ring 20 and is connected to arc-shaped passages 21 thereof, which communicate with the cylindrical slot 16 for the first auxiliary material as shown in FIG. 2. The first auxiliary material, which is pushed out from the first auxiliary material extruder 22 by a screw shaft 22a thereof, is accumulated in an accumulator 23 and thereafter sent to the arc-shaped passages 21. The passages 21 are provided symmetrically to each other with regard to the center of the head ring 20. Inlet ports 21a and 21b are respectively provided at both the ends of one of the arc-shaped passages 21 and another set of inlet ports 21a and 21b are respectively provided at both the ends of the other arc-shaped passage 21 so that the four inlet ports are located at angular intervals of about 90 degrees along the circumference of the head ring 20 and are connected to the cylindrical slot 16 for the first auxiliary material. As a result, the first auxiliary material is supplied to the cylindrical slot 16 through the four inlet ports 21a and 21b. A first injection passage 22b of the first auxiliary material extruder 22 is connected to the central portion of a first semicircular injection passage 22c thereof. A feed port 22d is provided at both the ends of the first semicircular injection passage 22c. Each feed port 22d is connected to the central portion of the corresponding arc-shaped passage 21, such that the respective passage 21 extends in opposite directions from the corresponding feed port.

A second auxiliary material extruder 30, for injecting a second auxiliary material to make inner and outer adhesive layers, communicates with arc-shaped passages 34 and 35 of the head ring 20 through a second auxiliary material injection passage means 33. The passage means 33 has an injection passage 31 for the inner adhesive layer of the second auxiliary material and an injection passage 32 for the outer adhesive layer of the material so that the injection passages communicate with each other. The extruder 30 is connected to the outside portions of the head ring 20. The outside portions of the ring 20 are different from the portions which are connected to the first auxiliary material extruder 22. The second auxiliary material, which is pushed out from the second auxiliary material extruder 30 by a screw shaft 30a thereof, is supplied to the arc-shaped passages 34 and 35 through an accumulator 36 for the inner adhesive layer of the second auxiliary material and an accumulator 37 for the outer adhesive layer of the material.

Figure 3:
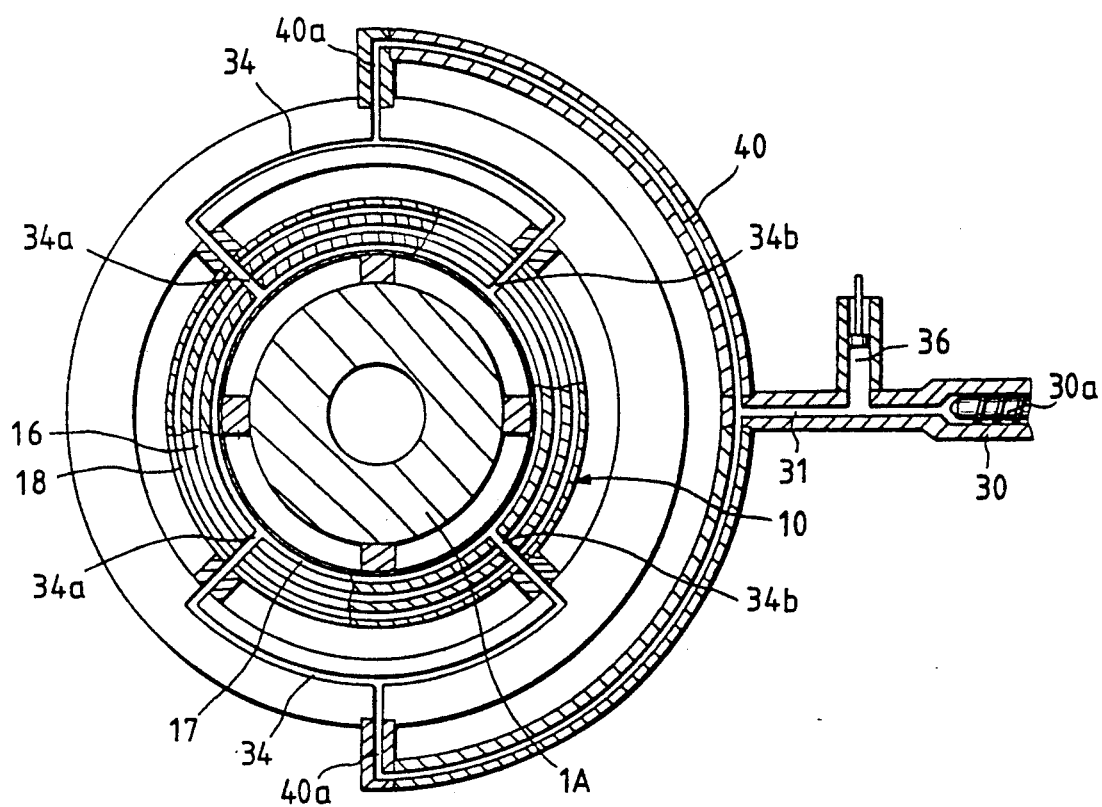
FIG. 3 is a cross-sectional view of the extruder taken along line II—II shown in FIG. 1, and shows a second auxiliary material injection passage for forming an inner layer.

As shown in FIGS. 3 and 4, the arc-shaped passages 34 and 35 are provided symmetrically to each other with regard to the center of the head ring 20 so that the passages 34 are located over the other passages 35. A pair of inlet ports 34a and 34b is provided for each of the arc-shaped passages 34 so that an inlet port is provided at the respective ends of each passage 34. Likewise, a pair of inlet ports 35a and 35b is provided for each of the other arc-shaped passages 35 so that an inlet port is provided at the respective ends of each passage 35. Thus, the four inlet ports 34a and 34b are connected to the cylindrical slot 17 at angular intervals of about 90 degrees and the other four inlet ports 35a and 35b are connected to the cylindrical slot 18 at angular intervals of about 90 degrees. As a result, the second auxiliary material is supplied to each of the cylindrical slots 17 and 18 through the corresponding four inlet ports.

As shown in FIGS. 3 and 4, the injection passage 31, which is for the inner adhesive layer of the second auxiliary material and is connected to the second auxiliary material extruder 30, and the other injection passage 32, which is for the outer adhesive layer of the material and is connected to the extruder 30, communicate with the central portions of second and third semicircular injection passages 40 and 41, respectively. Feed ports 40a are provided at opposite ends of the semicircular injection passage 40 and are connected to the central portions of the arc-shaped passages 34. Feed ports 41a are provided at opposite ends of the semicircular injection passage 41 and are connected to the central portions of the arc-shaped passages 35.

As shown in FIG. 5 which is a developed schematic sectional view of the extruder, the first and the second auxiliary materials are supplied to the cylindrical slots 16, 17 and 18 of the multilayer head 10 through the passages of the head ring 20 provided over the entire circumference of 360°.

The operation of the multilayer parison extruder will now be described in detail. The main material pushed out or fed from the main material extruder 6 by the screw shaft 6a thereof is sent to the material accumulation chamber 3 so that the material is accumulated therein while pushing up the annular piston 5. The first and the second auxiliary materials pushed out from the first and the second auxiliary material extruders 22 and 30 are sent to the accumulators 23, 36 and 37 so that the materials are accumulated therein while pushing up the pistons 23a, 36a and 37a of the accumulators, respectively. When the main and the auxiliary materials have reached prescribed accumulated quantities, the pistons 5, 23a, 36a and 37a are pushed down simultaneously so that the main material is sent, under pressure, toward the die slot 14 through the inner layer material passage 12 and the outer layer material passage 13 while being divided into inner and outer layers by the multilayer head 10, the first auxiliary material is injected as the barrier layer from the cylindrical slot 16 and placed between the inner and the outer layers of the main material, and the second auxiliary material is injected as the inner and the outer adhesive layers from the cylindrical slots 17 and 18 and placed between the inner and the outer layers of the main material.

The auxiliary materials injected from the cylindrical slots 16, 17 and 18 pass through the head confluence slot 19 so that the inner and the outer adhesive layers of the second auxiliary material extend on both the sides of the barrier layer of the first auxiliary material. The main and the auxiliary materials are then extruded from the die slot 14 so that the materials constitute a cylindrical multilayer parison 60 in which the barrier layer of the first auxiliary material 50 and the inner and the outer adhesive layers of the second auxiliary material 51 on both the sides of the barrier layer are sandwiched between the inner and the outer layers of the main material 52 as shown in FIG. 6.

The first auxiliary material pushed out from the first auxiliary material extruder 22 is sent to the cylindrical slot 16 through the first semicircular injection passage 22c, the pair of feed ports 22d, the pair of arc-shaped passages 21 and the four inlet ports 21a and 21b so that the barrier layer of uniform thickness is made of the first auxiliary material in the cylindrical slot. The second auxiliary material pushed out from the second auxiliary material extruder 30 is sent to the cylindrical slots 17 and 18 through the first and the second semicircular injection passages 40 and 41, the pairs of feed ports 40a and 41a, the pair of arc-shaped passages 34, the pair of arc-shaped passages 35, the four inlet ports 34a and 34b and the four inlet ports 35a and 35b so that the inner and the outer adhesive layers of uniform thickness are made of the second auxiliary material in the cylindrical slots.

The present invention is not confined to the above-described embodiment, but may be embodied or practiced in other various ways without departing from the spirit or essential character thereof. For example, although each of the first and the second auxiliary materials is introduced into the corresponding cylindrical slot through the four inlet ports in the above-described embodiment, the present invention may be otherwise embodied so that each of the auxiliary materials is introduced into the cylindrical slot through more than four inlet ports to produce the same effect as the preceding embodiment. Although the multilayer parison is made of the five layers of three kinds of materials by the above-described embodiment, the present invention may be otherwise embodied so that a multilayer parison is made of three layers of three kinds of materials by actions similar to those in the preceding embodiment.

What is claimed is:

1. A multilayer parison extruder which is intermittently driven in accordance with a closing movement of a cavity, comprising:
   a cylinder;
   an annular piston movably fitted in said cylinder;
   a material accumulation chamber in which said piston is moved;
   an annular material conduction chamber communicating with said accumulation chamber;
   an annular multilayer head provided in said conduction chamber, said annular multilayer head being positioned in said conduction chamber so as to define an inner layer material passage and an outer layer material passage;
   a die slot provided under said conduction chamber;
   a main material extruder for supplying a main material to said accumulation chamber; and
   a plurality of auxiliary material extruders for supplying a plurality of auxiliary materials to said annular multilayer head; wherein said annular multilayer head includes three cylindrical slots, with each slot receiving a corresponding one of said auxiliary materials, said three cylindrical slots being arranged such that one of said slots is centrally located for receiving one of said plurality of auxiliary materials and the other two slots are respectively positioned radially inwardly and outwardly of said one slot which is centrally located, the auxiliary material which is supplied to the other two slots comprising an adhesive, such that the auxiliary material supplied to said one slot which is centrally located is sandwiched between two adhesive layers thereby increasing a precision of a thickness of the auxiliary material supplied to said one slot which is centrally located; and means for communicating each of said three cylindrical slots with a corresponding one of said plurality of auxiliary material extruders, said communicating means comprising:
   a pair of diametrically opposed feed ports;
   a separate arc-shaped passage connected to each of said feed ports such that each said arc-shaped passage extends in opposite directions by nearly equal distances from the corresponding feed port along a circumference of said annular multilayer head to opposite end portions; and
   at least one pair of inlet ports for each arc-shaped passage such that a separate inlet port communicates with a corresponding one of said opposite end portions of each arc-shaped passage, said inlet ports being connected to a corresponding one of said three cylindrical slots to thereby provide at least four inlet ports for the corresponding cylindrical slot so that the inlet ports for the corresponding cylindrical slot are located at nearly equiangular intervals along the circumference of said annular multilayer head;
   wherein said inlet ports for the cylindrical slot positioned radially inwardly in relation to the centrally located cylindrical slot are positioned at the same angular location along the circumference of said cylinder as said inlet ports for the cylindrical slot positioned radially outwardly in relation to the centrally located cylindrical slot;
   wherein said communicating means further comprises a plurality of semicircular passages disposed exteriorly of said cylinder and which follow along an outer circumference of said cylinder, each said semicircular passage communicating a corresponding one of said pair of diametrally opposed feed ports with a corresponding one of said plurality of auxiliary material extruders; said communicating means further comprising a pair of injection passages having first ends connected to one of said plurality of auxiliary material extruders, each of said injection passages having an accumulator therein and having a second end connected to a corresponding one of said plurality of semicircular passages; and
   further wherein during extrusion, said main material flows into said inner layer material passage and said outer layer material passage so as to sandwich said plurality of auxiliary materials therebetween before exiting said die slot.

2. The multilayer parison extruder according to claim 1, wherein three cylindrical slots are provided in the annular multilayer head so that a five-layer parison is formed.

3. The multilayer parison extruder according to claim 1, wherein said inlet port has a first end portion and a second end portion, said first end portion of each one pair of inlet ports communicating with a corresponding one of said opposite end portions of each arc-shaped passage, said second end portion of each one pair of inlet ports being connected to a corresponding one of said cylindrical slots to thereby provide four inlet ports for the corresponding cylindrical slot.

4. A multilayer parison extruder comprising:
a cylinder;
an annular piston movably fitted in said cylinder;
a material accumulation chamber in which said piston is moved;
a material conduction chamber communicating with said accumulation chamber;
an annular multilayer head provided in said conduction chamber;
a die slot provided under said conduction chamber;
a main material extruder for supplying a main material to said accumulation chamber; and
a plurality of auxiliary material extruders for supplying a plurality of auxiliary materials to said annular multilayer head; wherein said annular multilayer head includes three cylindrical slots, with each slot receiving a corresponding one of said auxiliary materials, said three cylindrical slots being arranged such that one of said slots is centrally located for receiving one of said plurality of auxiliary materials and the other two slots are respectively positioned radially inwardly and outwardly of said one slot which is centrally located; and means for communicating each of said three cylindrical slots with a corresponding one of said plurality of auxiliary material extruders, said communicating means comprising:
a pair of diametrically opposed feed ports;
a separate arc-shaped passage connected to each of said feed ports such that each said arc-shaped passage extends in opposite directions by nearly equal distances from the corresponding feed port along a circumference of said annular multilayer head to opposite end portions; and
at least one pair of inlet ports for each arc-shaped passage such that a separate inlet port communicates with a corresponding one of said opposite end portions of each arc-shaped passage, said inlet ports being connected to a corresponding one of said three cylindrical slots to thereby provide at least four inlet ports for the corresponding cylindrical slot so that the inlet ports for the corresponding cylindrical slot are located at nearly equiangular intervals along the circumference of said annular multilayer head;
wherein said inlet ports for the cylindrical slot positioned radially inwardly in relation to the centrally located cylindrical slot are positioned at the same angular location along the circumference of said cylinder as said inlet ports for the cylindrical slot positioned radially outwardly in relation to the centrally located cylindrical slot.

* * * * *